United States Patent [19]

Shimada et al.

[11] Patent Number: 5,219,212
[45] Date of Patent: Jun. 15, 1993

[54] ANTI-SKID CONTROL SYSTEM FOR VEHICLE

[75] Inventors: Kousaku Shimada, Katsuta; Shigeru Horikoshi, Mito; Tatsuhiko Monji, Katsuta, all of Japan

[73] Assignee: Hitachi, Ltd., Tokyo, Japan

[21] Appl. No.: 888,612

[22] Filed: May 27, 1992

[30] Foreign Application Priority Data

Jun. 5, 1991 [JP] Japan .................. 3-134153

[51] Int. Cl.$^5$ .......................... B60T 8/32; B60T 8/58
[52] U.S. Cl. .................. 303/92; 188/181 A; 303/100; 303/111; 303/103; 364/426.01
[58] Field of Search ............... 303/92, 100, 111, 102, 303/103, 108, 109, 110, 105, 106, 107, 20; 180/197; 364/426.01, 426.02, 426.03; 188/181 A, 181 R

[56] References Cited

U.S. PATENT DOCUMENTS

| | | | |
|---|---|---|---|
| 4,489,382 | 12/1984 | Jonner et al. | 303/110 X |
| 4,593,955 | 6/1986 | Leiber | 303/111 X |
| 4,837,552 | 6/1989 | Vandemotter et al. | 303/92 X |
| 5,063,514 | 11/1991 | Headley et al. | 303/111 X |
| 5,066,074 | 11/1991 | Wupper | 303/111 X |
| 5,134,352 | 7/1992 | Matsumoto et al. | 303/92 X |

FOREIGN PATENT DOCUMENTS

| | | |
|---|---|---|
| 60-45457 | 3/1985 | Japan . |
| 63-46961 | 2/1988 | Japan . |
| 1-195168 | 8/1989 | Japan . |
| 1-208256 | 8/1989 | Japan . |

*Primary Examiner*—Douglas C. Butler
*Attorney, Agent, or Firm*—Evenson, McKeown, Edwards & Lenahan

[57] ABSTRACT

An anti-skid control system of a vehicle comprising a yaw motion sensing device of the vehicle, a device for calculating target slip rates of the wheels according to the yaw motion, a wheel speed detecting device for detecting actual speeds of the wheels, a control device for generating a control signals based on the target slip rates and the actual speeds of the wheels, a control valve for controlling braking oil pressure according to the control signals, a first failure detecting device for detecting an abnormality relating to the yaw motion sensing device, a second failure detecting device for detecting an abnormality relating to the control valve, and a failsafe control device for keeping the target slip rates from the calculating device constant and when the abnormality relating to the yaw motion sensing device is detected and for bringing the control valve into a non-operating state when the abnormality relating to the control valve is detected.

8 Claims, 9 Drawing Sheets

ANTI-SKID CONTROL SYSTEM FOR VEHICLE

BACKGROUND OF THE INVENTION

The present invention relates to an anti-skid control system used on automobiles and more particularly to a safety device for the anti-skid control system suitable for improving the car stability during braking.

Conventional anti-skid control systems have a valve mechanism that can reduce or hold the braking oil pressure while the car is running on roads having low surface friction coefficients, such as icy or snowy roads. With the valve mechanism, the conventional anti-skid control systems can prevent the wheels from getting locked and secure a steering stability without elongating the braking distance.

It is noted, however, that the conventional anti-skid control systems cannot secure the steering stability and the sufficient braking force on all kinds of road surfaces. Particularly when there is a difference in the frictional coefficient between the road surfaces on which the left and right wheels are running, that is, when the car is traveling on the split $\mu$ road, the control that makes the slip rates of the left and right wheels equal will produce a difference between the braking forces acting on the left and right wheels. This imbalance of braking forces will cause a yaw moment, making the car unstable.

To improve the stability on the above-mentioned split $\mu$ road, the conventional anti-skid control system performs a so-called select-low control, which makes other braking oil pressures equal to that of the wheel that easily locks. This control, however, produces too small a braking force, increasing the braking distance.

The Japanese Patent Laid-Open No. 1-208256(1989) carries this method a step further and discloses a control which, when the car is unstable with a large yaw rate (yaw angle) increases the cornering force (side force) by reducing the target slip rate of the rear wheels, thereby improving the driving stability of the car.

General anti-skid control systems have a safety device for performing a failsafe processing. One such example is disclosed in the Japanese Patent Laid-Open No. 60-45457(1985). This safety device, when it detects a broken wire of a wheel speed sensor, cuts off the relay of the anti-skid control system to disable a control valve and therefore the anti-skid control. Another example is cited in the Japanese Patent Laid-Open No. 63-46961(1988) and 1-195168(1989). When it detects failure of ground sensor or acceleration sensor, the safety device determines the estimated car speed from a signal of other sensor, i.e., wheel speed sensor, and performs the anti-skid control based on this estimated car speed.

As mentioned above, the anti-skid control system of the Japanese Patent Laid-Open No. 1-208256(1989) improves the cornering force by reducing the target slip rate of the rear wheels when the car is running in an unstable condition with a large yaw rate. However, no consideration is given to ensure a failsafe of the system in the event of a failure of the sensor that detects the yaw rate. Hence, when the sensor for sensing the yaw rate fails and produces an erroneous output, the system controls the car at a reduced target slip rate even when the car is not in the unstable condition, increasing the braking distance.

The safety device for the general anti-skid control system, as disclosed in the Japanese Patent Laid-Open No. 60-45457(1985), disables the control valve upon detection of a sensor failure. This method has a drawback that a yaw sensor failure leads to a system down even when the control valve is normal making the fundamental operation of the anti-skid control system impossible.

Further, the method described in the Japanese Patent Laid-Open No. 63-46961(1988) and 1-195168(1989) uses as a means to detect the car speed the ground sensor or acceleration sensor that has higher precision than the wheel speed sensor. When a sensor failure is detected, this method switches over to the wheel speed sensor that has lower precision. This method therefore cannot be applied where a spare or standby sensor is not used.

SUMMARY OF THE INVENTION

An object of this invention is to provide a safety device for the anti-skid control system, which has a yaw motion detection means to perform the anti-skid control by changing the target slip rate according to the detected value of yaw motion, and performs an optimum failsafe processing according to the location of a failure in the system.

To achieve the above objective, the safety device of this invention comprises: a wheel speed detecting means for detecting the speeds of a plurality of wheels of a vehicle; a yaw motion sensing means for sensing the yaw motion of the vehicle; a calculating means for changing the target slip rates of the wheels according to the yaw motion; a control means for generating a control signal to make the wheel slip rates follow the target slip rates; a control valve to increase, decrease or hold the braking oil pressure according to the control signal; a first failure detecting means to detect a failure of the yaw motion sensing means; a second failure detecting means to detect a failure of the control valve; and a failsafe means to select a first failsafe mode in which the target slip rates of the wheels are kept constant regardless of the yaw motion when a failure of the yaw otion sensing means is detected, and to select a second failsafe mode in which the control valve are brought into a non-operating state to disable the anti-skid control itself when a failure of the control valve is detected.

Preferably, the yaw motion sensing means is connected to a controller through wiring harnesses, and the first failure detecting means detects, as a failure of the yaw motion sensing means, at least one of a failure and an output anomaly of the yaw motion sensing means and a broken wire of the wiring harnesses.

Further, it is preferred that the control means have a control valve drive circuit connected to the control valve through wiring harnesses, and that the second failure detecting means detect, as a failure of the control valve, at least one of a failure of the control valve itself, a failure of the control valve drive circuit and a broken wire of the wiring harnesses.

It is also preferred that a third failure detecting means be provided to detect a failure of the wheel speed detecting means, and that the failsafe means select the second failsafe mode when a failure of the wheel speed detecting means is detected.

This invention offers the following advantages when a brake is applied while the car is running on a road with small friction coefficient $\mu$.

In the event of a failure of the yaw motion sensing means, the failsafe means selects the first failsafe mode to perform an anti-skid control, which is independent of the output of the yaw motion sensing means. That is, the anti-skid control with the target slip rates fixed to a constant value is performed. This assures good braking performance and stability for general anti-skid control.

When the control valve is failed, the failsafe means selects the second failsafe mode to disable the anti-skid control. Although in the second failsafe mode the car easily locks, the car is prevented from being exposed to the danger of no-brake condition as will be brought about by the control valve failure, thereby securing a minimum level of safety.

DESCRIPTION OF THE PREFERRED EMBODIMENTS

One example embodiment of the invention will be described by referring to FIGS. 1 through 11.

Figure 1:
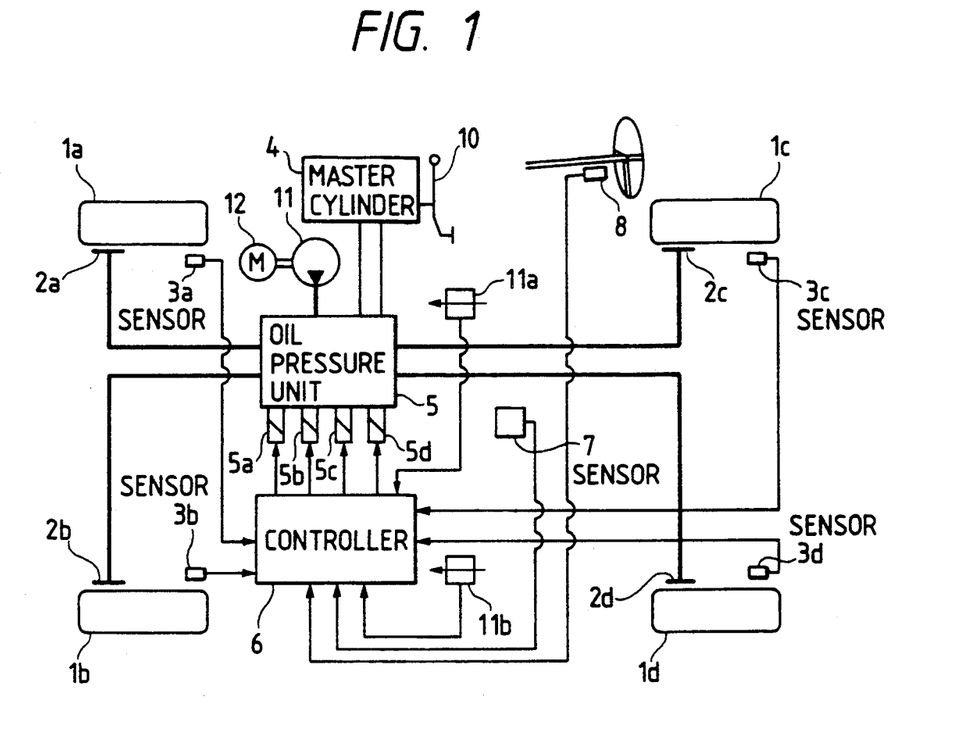
FIG. 1 is an overall configuration of the anti-skid control system as one embodiment of the invention.

FIG. 1 shows the configuration of the anti-skid control system of this embodiment.

In FIG. 1, reference numerals 1a to 1d represent four wheels of a car mounted with the anti-skid control system of the embodiment, i.e., front right, front left, rear right and rear left wheel. These wheels are provided with wheel cylinders 2$1$-2d for hydraulic braking and wheel speed sensors 3a-3d for detecting the revolution speed of each wheel.

The braking oil pressure supplied to the wheel cylinders 2a-2d is generated by a master cylinder 4 and an oil pressure unit 5 according to the operation of the brake pedal 10. That is, the operation of the brake pedal 10 produces a pressure inside the master cylinder 4, which is transmitted to the oil pressure unit 5 and then to the wheel cylinders 2a-2d.

The oil pressure unit 5 is provided with solenoid valves 5a-5d that increase, hold and reduce (release) the braking oil pressure to be applied to the wheels 1a-1d. The solenoid valves are driven by signals (currents) from a controller 6. The oil pressure unit 5 is connected with a hydraulic pump 11 as an oil pressure source driven by a motor 12.

Figure 4A:
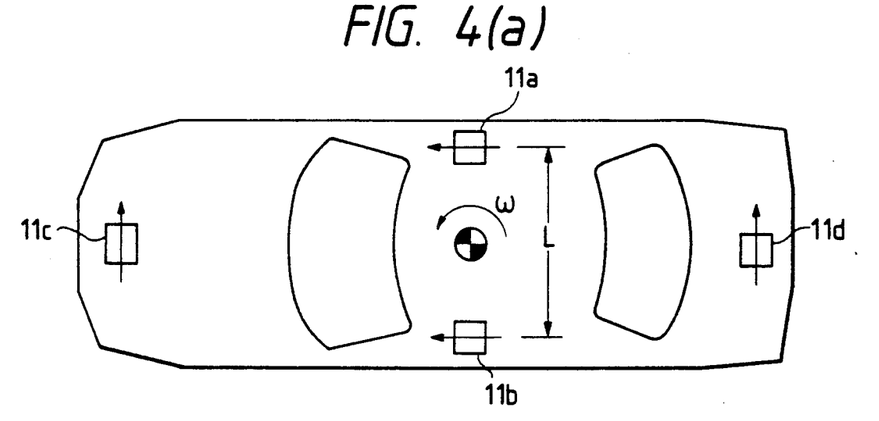
FIGS. 4(a) and 4(b) represent diagrams showing the location of an acceleration sensor in the invention.
Figure 4B:
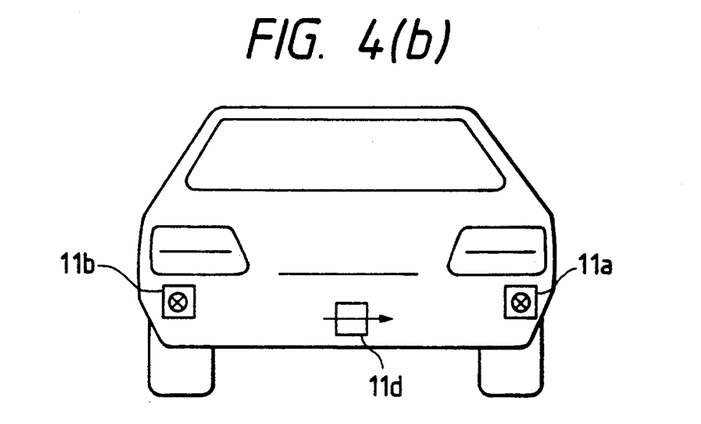

The car body is fitted with a steering angle sensor 8 that detects the rotary position of a steering wheel 9 and an angular speed sensor 7 that detects the yaw rate (yaw angular speed) of the car. Instead of using the angular speed sensor 7, it is possible to arrange two acceleration sensors 11a, 11b on both sides of the car to detect the acceleration in the forward and backward direction or install two acceleration sensors 11c, 11d (see FIG. 4) at the front and rear of the car to detect the lateral acceleration. The controller 6 receives signals from the wheel speed sensors 3a–3d and from sensors 7, 8 or 8, 11a, 11b.

Next, we will explain about the fundamental operation of the anti-skid control system.

There various kinds of anti-skid control system available and their basic operation may be summarized as follows.

Let the wheel revolution speeds determined from the sensors 3a-3d and the estimated car speed determined from the wheel revolution speeds be $V_{fr}$: revolution speed of the front right wheel
$V_{fl}$: revolution speed of the front left wheel
$V_{rr}$: revolution speed of the rear right wheel
$V_{rl}$: revolution speed of the rear left wheel
$V$: estimated car speed, respectively.

Then the slip rates of the wheels are given by $$S_{fr} = (V - V_{fr})/V \quad (S_{fr}: \text{slip rate of front right wheel}) \tag{11}$$

$$S_{fl} = (V - V_{fl})/V \quad (S_{fl}: \text{slip rate of front left wheel}) \tag{12}$$

$$S_{rr} = (V - V_{rr}) = (V - V_{rr})/V \quad (S_{rr}: \text{slip rate of rear right wheel}) \tag{13}$$

$$S_{rl} = (V - V_{rl})/V \quad (S_{rl}: \text{slip rate of rear left wheel}) \tag{14}$$

Figure 2:
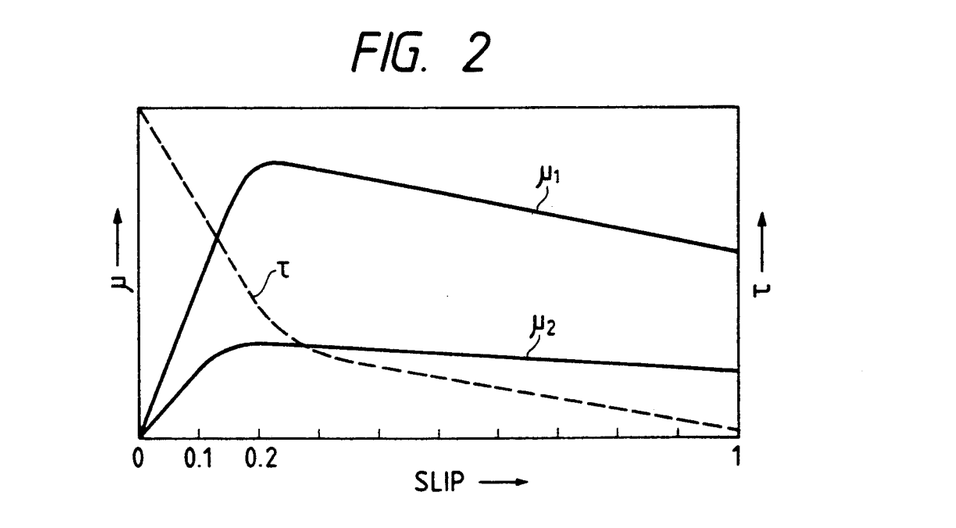
FIG. 2 is a graph showing the relationship between the slip rate, friction coefficient and lateral drag coefficient in the invention.

The relationship between the slip rate and the friction coefficient $\mu$ is shown in FIG. 2. Based on this relationship, the target slip rates for the wheels are set near 0.2. When the slip rates are larger than this value, the solenoid valves 5a-5d are operated to reduce (release) the oil pressure in the wheel cylinders 2a-2d. This causes the wheel revolution speed to gradually increase to the car speed, reducing the slip rates. When the slip rates are very small, near 0.2, the oil pressure in the wheel cylinders 2a-2d is increased to increase the braking torque of the wheels, raising the slip rates.

By repetitively changing the oil pressure in the wheel cylinders 2a-2d, it is possible to bring the slip rates close to the set value and thereby make the braking force the maximum and permit stable braking without reducing the lateral drag that contributes to stabilized dravability.

However, the above operation assumes that the four wheels are running on the same road surface. Let us define the braking forces detected from each wheel as follows:

$F_{fr}$: braking force of front right wheel
$F_{fl}$: braking force of front left wheel
$F_{rr}$: braking force of rear right wheel
$F_{rl}$: braking force of rear left wheel Then, if we assume that the left and right wheels have the same friction coefficients $\mu$ with respect to the road surface when there is no difference between the vertical loads $W_f$, $W_r$ acting on the left and right wheels, the following relationships hold.

$$F_{fl} = F_{fr} = \mu \cdot W_f \tag{21}$$

$$F_{rl} = F_{rr} = \mu \cdot W_r \tag{22}$$

Since there is no difference between the front and rear lateral drag forces, the stabilized running of the car is ensured.

Figure 3:
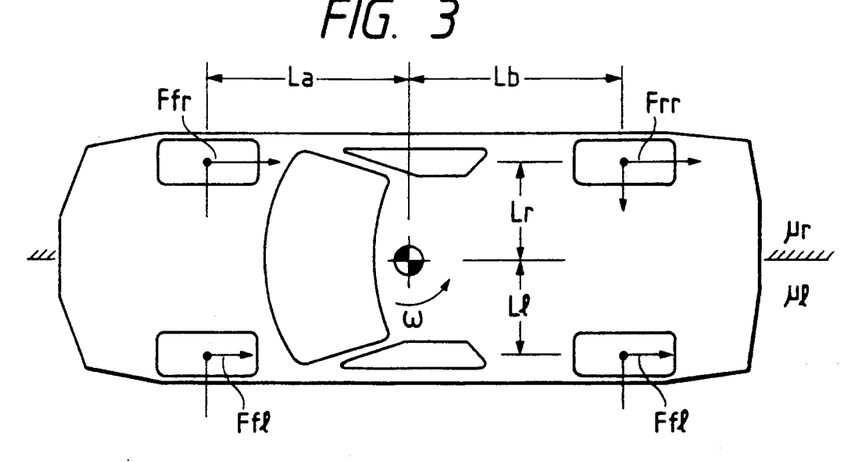
FIG. 3 is a diagram showing the balance of moments acting on the automobile body in the invention.

When there is a difference in the friction coefficient between the left and right wheels, e.g., the friction coefficient on the right side is higher or $\mu r > \mu l$, then as shown in FIG. 3, the following relationships hold.

$$F_{fr} = \mu r \cdot W_f > F_{fl} = \mu l \cdot W_f \tag{31}$$

$$F_{rr} = \mu r \cdot W_r > F_{rl} \mu l \cdot W_r \tag{32}$$

This means that a moment expressed below occurs about the center of gravity of the car.

$$Mb = L_r(F_{fr} + F_{rr}) - L_1(F_{fl} + F_{rl}) - L_d(C_{fr} + C_{fl}) - L_b(C_{rr} + C_{rl}) \tag{4}$$

where $C_{fr}$, $C_{fl}$, $C_{rr}$ and $C_{rl}$ are cornering forces produced by the front right, front left, rear right and rear left wheels, respectively. The maximum values of the cornering forces are lower than the lateral drag force shown in FIG. 2.

When $$L_r(F_{fr}+F_{rr}) - L_1(F_{fl}+F_{rr})$$
$$< L_d(C_{fr}+C_{fl}) + L_b(C_{rr}+C_{rl}),$$

then the moment produced by the difference between the braking forces on the left and right wheels is canceled by the lateral drag force of the tires, so that no yaw moment or yaw is generated on the car.

However, as the difference in the friction coefficient $\mu$ between the left and right road surfaces increases, the following relationship is established.

$$L_r(F_{fr}+F_{rr}) - L_1(F_{fl}+F_{rr})$$
$$> L_1(C_{fr}+C_{fl}) + L_b(C_{rr}+C_{rl}),$$

That is, the car is subjected to a yawing force.

This yaw is not one produced by the driver's steering operation but one generated by the condition of the road surface, and thus is contrary to the will of the driver. The yaw is also not expected by the driver and may lead to an accident.

To avoid this problem, the system described in the Japanese Patent Laid-Open No. 208256/1989 performs the control which, when the car is running in an unstable condition with large yaw rate, lowers the target slip rate of the rear wheel to increase the cornering force. However, when the sensor for detecting the yaw rate fails and produces an erroneous output, there is a possibility of the control being performed at a lowered target slip rate, increasing the braking distance.

To eliminate the above drawback, this invention performs the failsafe mode of the system in two separate processings.

(1)

A first failsafe mode, activated as when the yaw motion detection means is failed, in which the target slip rate for each wheel is set constant irrespective of the amount of yaw motion.

(2)

A second failsafe mode, activated as when the control valve fails, in which the anti-skid control itself is not performed.

This embodiment that realizes the above concepts will be described in detail in the following three items.

(1)

Method of detecting a yaw angular speed and a yaw angular acceleration.

(2)

Feedback control of the yaw motion.

(3)

First and second failsafe modes.

(1) Method of detecting a yaw angular speed and a yaw angular acceleration

In this invention, the yaw moment of the car is represented as the yaw angular speed and the yaw angular acceleration, and the imbalance between the braking forces on the left and right wheels is positively canceled by changing the target slip rates of the left and right wheels.

One method of determining the amount of yaw motion is to use an angular speed sensor such as an optical fiber gyro and a vibration gyro. The angular speed sensor 7 mounted on the car body is one such example and measures the yar angular speed $\omega$. This method can determine the yaw angular acceleration by differentiating the measured yaw angular speed.

Another method of determining the amount of yaw motion is to use an acceleration sensor. The acceleration sensors 11a, 11b mounted on the car body are one such example. As shown in FIGS. 4(a) and 4(b), a pair of acceleration sensors 11a, 11b to detect the acceleration in the forward and backward direction and another pair of acceleration sensors 11c, 11d to detect the acceleration in the lateral direction are mounted on the car body. The differential signals from these paired sensors are used to calculate the yaw angular speed.

This method will be explained by taking the case of the paired acceleration sensors 11a, 11b for example. When the car body is moved at the angular acceleration $\omega$ in a direction shown in FIG. 4(a), the acceleration sensor 11a produces a positive acceleration and the acceleration sensor 11b produces a negative acceleration. The absolute values of the accelerations generated are expressed by $$G(\phi) = (L^* \phi)/2 \tag{5}$$

where
  $G(\phi)$ = acceleration produced from the angular speed $\omega$
  L = distance between the acceleration sensors 11a, 11b
  $\phi$ = yaw angular acceleration (differential value of $\omega$).

In reality, the acceleration detected by each acceleration sensor includes an angular speed $G_b$ in forward and backward direction of the gravity center. The acceleration detected by the acceleration sensor 11a therefore is expressed as $$G_1 = G_b + (L^* \phi)/2 \tag{6}$$

where
  $G_1$ = acceleration measured by the acceleration sensor 11a
  $G_b$ = acceleration in the forward and backward direction of the gravity center The acceleration detected by the acceleration sensor 11b is the one in the above equation with the second term sign reversed.

$$G_2 = G_b - (L \cdot \ddot\phi)/2 \qquad (7)$$

Using the measured $G_1$ and $G_2$, the yaw angular acceleration $\ddot\phi$ can be determined as follows.

$$\ddot\phi = (G_1 - G_2)/L \qquad (8)$$

By solving the above equation using the detected values $G_1$, $G_2$ of the acceleration sensors 11a, 11b, the yaw angular acceleration $\ddot\phi$ is determined.

With this method it is possible to calculate the yaw angular speed $\omega$ by integrating the yaw angular acceleration $\ddot\phi$.

(2) Feedback control of the amount of yaw motion

As a countermeasure against the moment that occurs when there is a difference in friction coefficient $\mu$ between the left and right wheels, the method of the Japanese Patent Laid-Open No. 208256/1989 lowers the target slip rates of the rear wheels to increase the cornering force. On the contrary, this embodiment changes the target slip rates of the left and right wheels individually to cancel the yaw moment that is produced from the friction coefficient difference, a so-called anti-spin control. This control is explained by referring to the control block diagram of FIG. 5.

Figure 5:
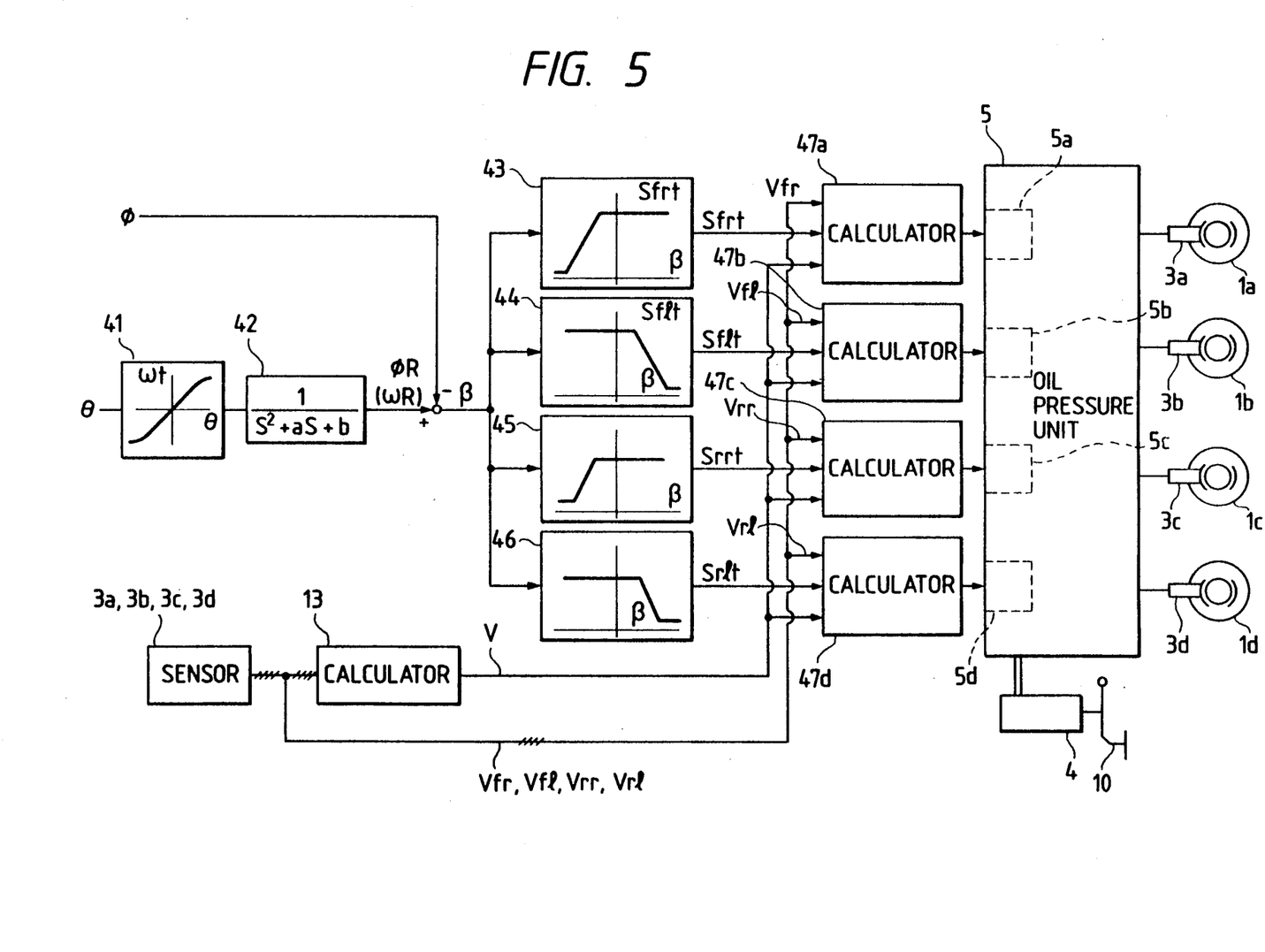
FIG. 5 is a control block diagram showing the processing performed by the yaw motion feedback control.

First, the yaw angular acceleration $\ddot\phi$, i.e., differential value of the yaw angular speed $\omega$, is compared with the target yaw angular acceleration, which is generated based on the steering speed. It is generally known that the secondary lag component of the steering speed is proportional to the yaw angular acceleration. The proportional component is generated by a block 41 and the secondary lag component by a block 42. A standard yaw angular acceleration $\ddot\phi R$ is generated from the differential value of the steering angle $\theta$ which is detected by the steering angle sensor 8.

The standard yaw angular acceleration $\ddot\phi R$ is then compared with the yaw angular acceleration $\ddot\phi$ measured by the method (1) to determine a difference or deviation $\beta$ between them.

Then, based on the yaw angular acceleration deviation $\beta$, the target slip rates $S_{frt}$, $S_{flt}$, $S_{rrt}$, $S_{rlt}$ for respective wheels are determined by the blocks 43, 44, 45, 46. These blocks have a table used to determine the target slip rates from the deviation $\beta$ according to the functional relationships as shown in each block of FIG. 5. The functional relationships essentially mean that when the car produces a clockwise yaw angular acceleration larger than the target yaw angular acceleration $\ddot\phi R$, the functions work to lower the target slip rates of the right wheels. As a result, in FIG. 2, the target slip rates of the right wheels, which were close to 0.2, can be lowered below 0.1, reducing the friction coefficients of the right wheels and generating a counterclockwise moment in the car.

Next, the blocks 47a–47d calculate, according to the equations shown below, the target wheel revolution speeds from the estimated car speed V which was determined from the wheel revolution speeds $V_{fr}$, $V_{fl}$, $V_{rr}$, $V_{rl}$ by the block 13-and from the target slip rates $S_{frt}$, $S_{flt}$, $S_{rrt}$, $S_{rlt}$.

$$V_{frt} = V^*(1 - S_{frt}) \qquad (91)$$

$$V_{flt} = V^*(1 - S_{flt}) \qquad (92)$$

$$V_{rrt} = V^*(1 - S_{rrt}) \qquad (93)$$

$$V_{flt} = V^*(1 - S_{flt}) \qquad (94)$$

According to the difference between the target wheel revolution speeds and the actual wheel revolution speeds, the solenoid valves 5a–5d are operated to either increase, hold or reduce the oil pressure.

The calculation to control the wheels to the target slip rates as performed by the blocks 47a–47d will be described by referring to FIGS. 6 and 7.

Figure 6:
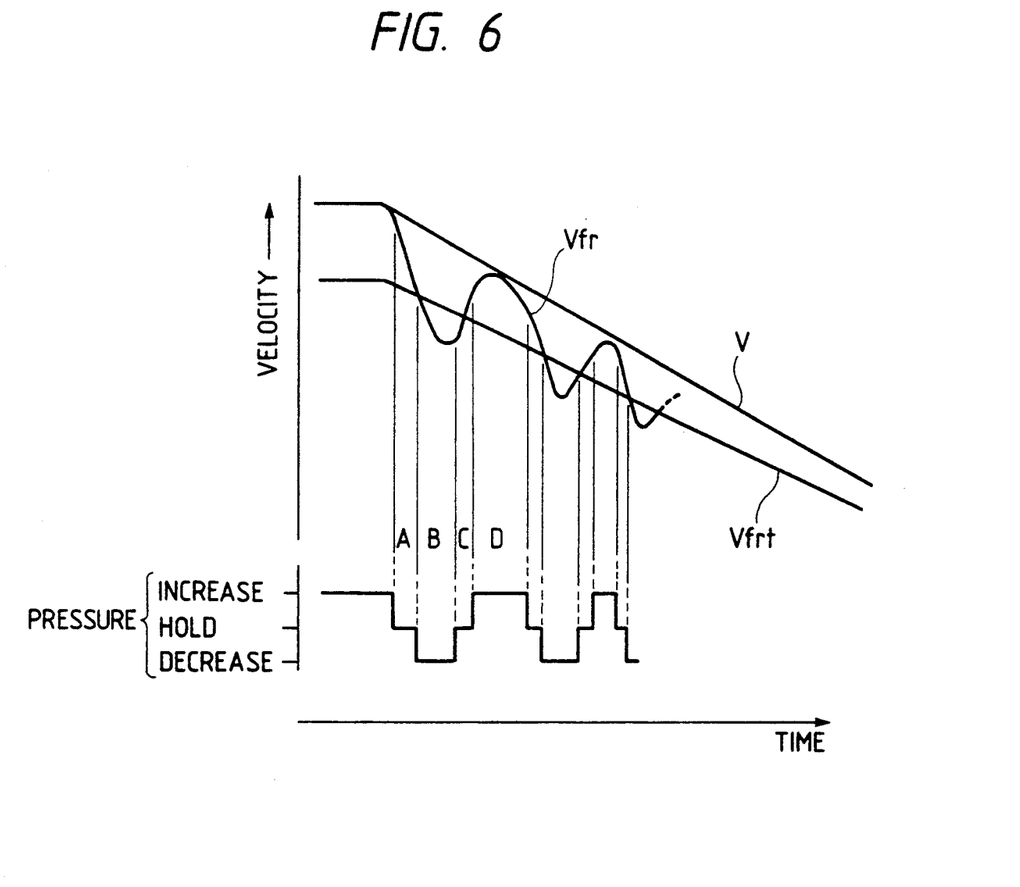
FIG. 6 is a time chart showing the operation of the control block of FIG. 5 with respect to the elapse of time.

FIG. 6 shows the process of controlling the target wheel revolution speed $V_{frt}$, which is obtained by substituting the target slip rate $S_{frt}$ in the equation (91). The reference symbols A–D in FIG. 6 represent the operation conditions for the solenoid valves.

Condition A: Hold the oil pressure when the wheel acceleration is $G_{fr} < G_L$.

Condition B: Reduce the oil pressure when the wheel velocity $V_{fr} <$ the target wheel velocity $V_{frt}$.

Condition C: Hold the oil pressure when the wheel acceleration is $G_{fr} > G_H$.

Condition D: Increase the oil pressure under conditions other than the above three conditions A, B, C.

Figure 7:
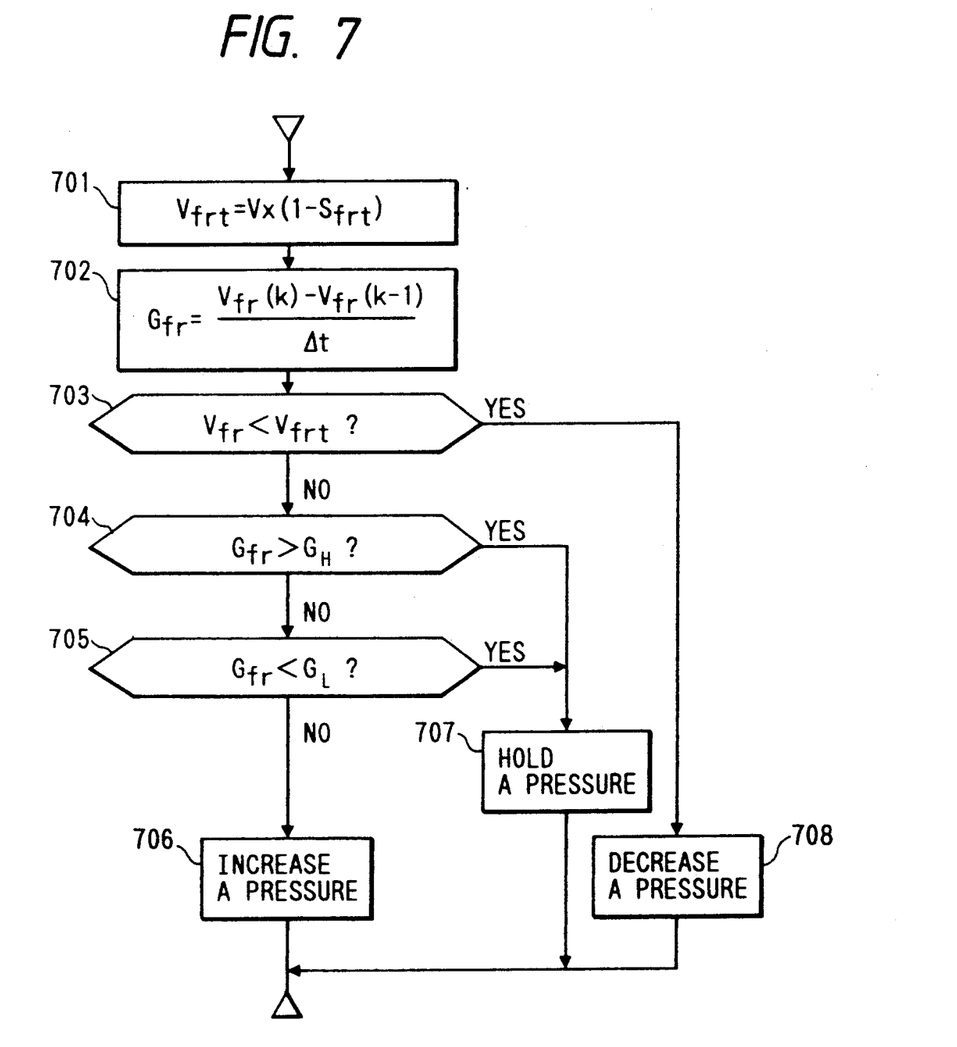
FIG. 7 is a flow chart of the wheel revolution control in the control block of FIG. 5.

The flow chart of the above conditions is shown in FIG. 7. This routine is carried out every $\Delta T$ (= 10 ms) for instance.

In FIG. 7, a step 701 calculates the target wheel speed. A step 702 calculates the wheel acceleration from the difference with respect to $V_{fr}$, which was calculated one cycle before. A step 703 checks the condition B of FIG. 6. A step 704 checks the condition C of FIG. 6. A step 705 checks the condition A of FIG. 6. When the steps 703–705 determine that the conditions A–C are not met, the condition D is established and the next step 706 operates the solenoid valve to increase the oil pressure. When the steps 703 and 704 determine that the condition B and C are met a step 707 holds the solenoid valve. When the step 705 decides that the condition A is satisfied, a step 708 releases the solenoid valve to reduce the oil pressure.

In the above description, the operation of the block 47a in FIG. 5 has been explained. Similar processing is also done by other blocks 47b–47d to make the wheel speeds follow the target wheel speeds.

These processings and calculations are performed by microcomputer in the controller 6.

(3) First and second failsafe mode

Next, the failsafe processing in the anti-skid control will be explained by referring to FIGS. 8 through 11.

Figure 8:
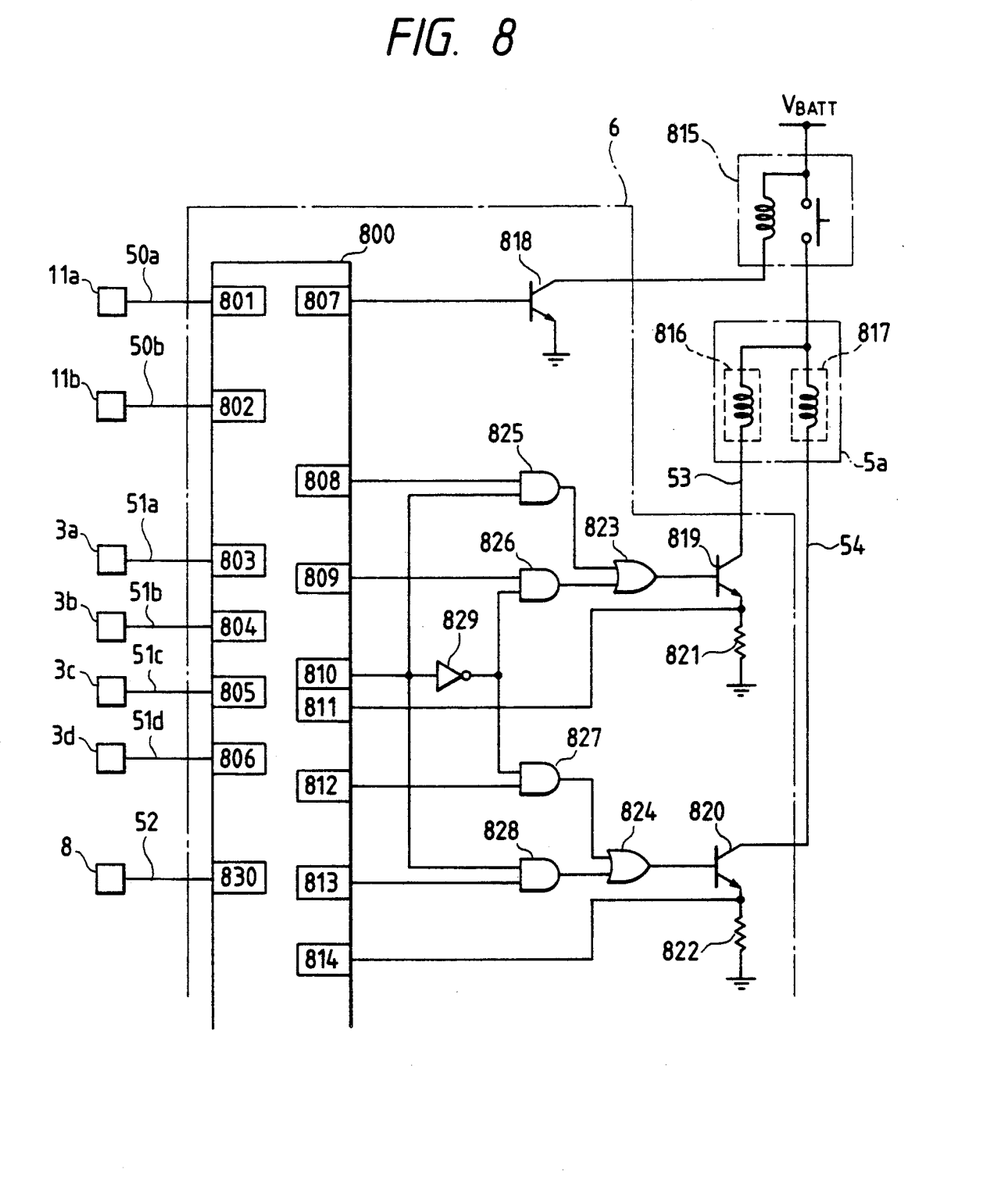
FIG. 8 is a circuitry of the safety device according to the invention that implements the failsafe processing with semihardware.
Figure 9:
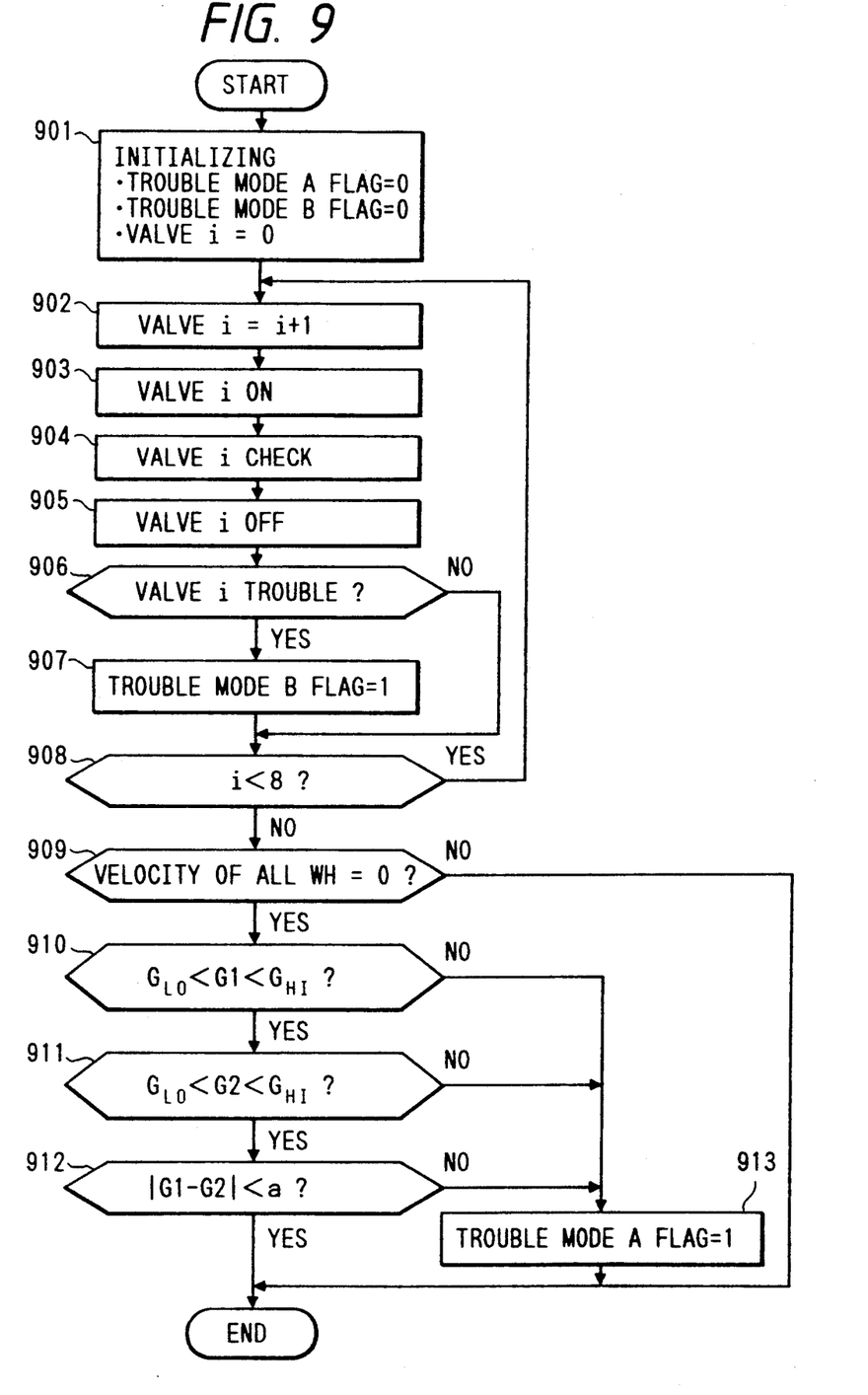
FIG. 9 is a flow chart showing the initial diagnostic of the failsafe processing of FIG. 8.
Figure 10:
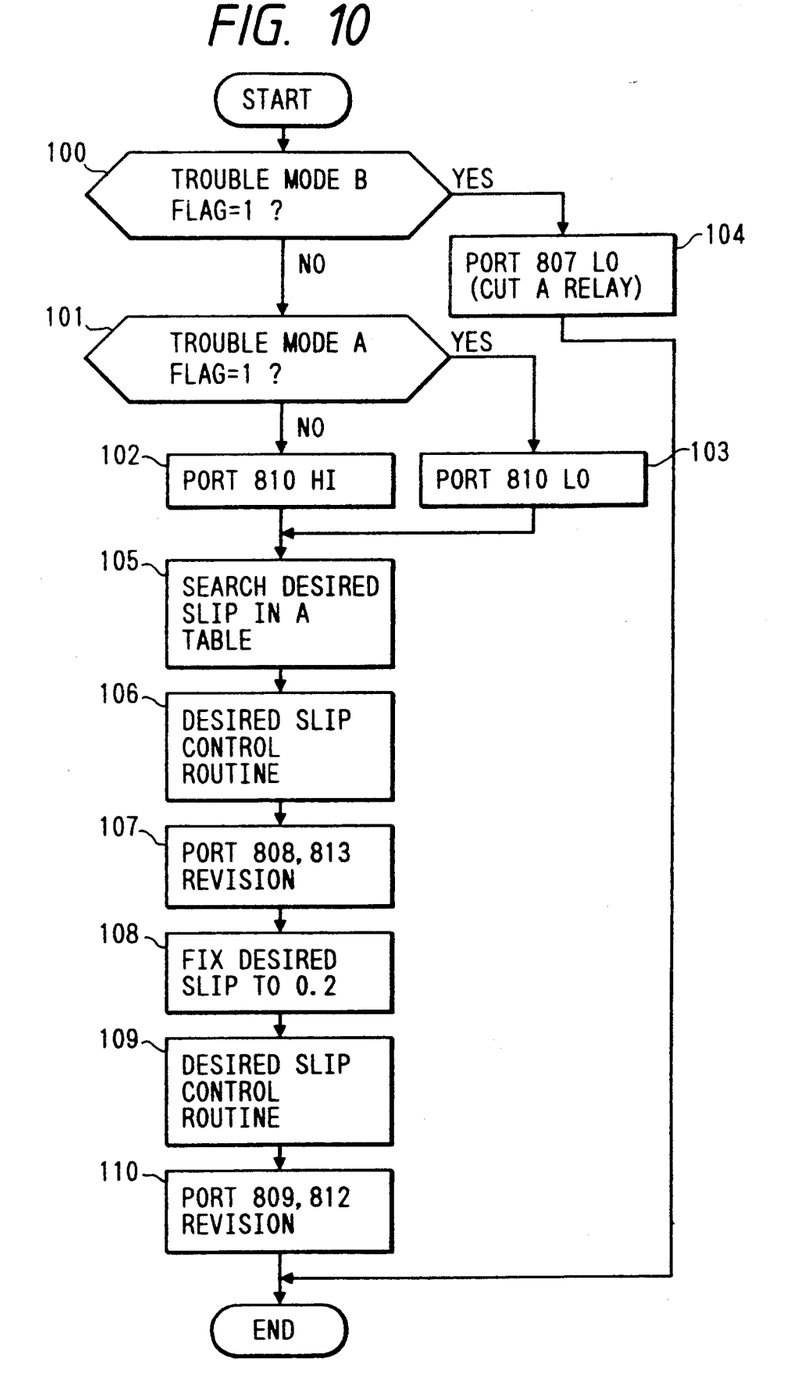
FIG. 10 is a flow chart showing a software portion other than the initial diagnostic of the failsafe processing of FIG. 8.
Figure 11:
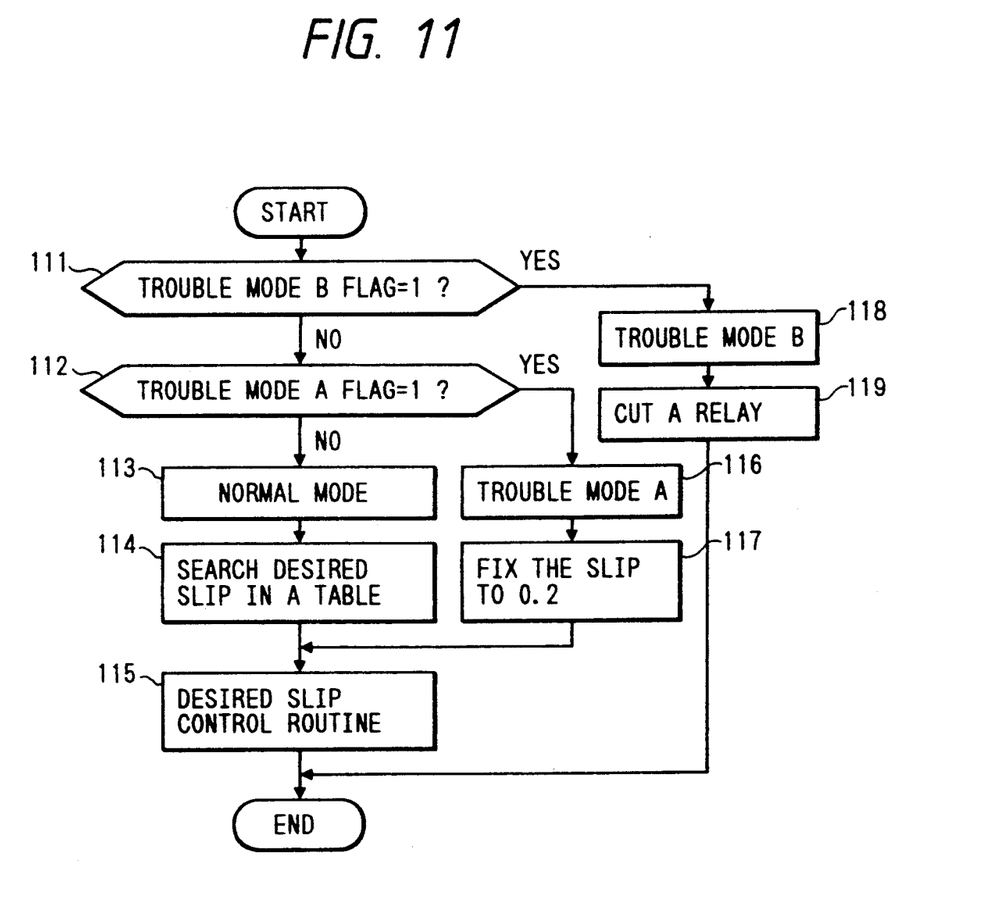
FIG. 11 is a flow chart of the safety device that performs the failsafe processing of the invention with full software.

FIG. 8 shows the hardware configuration of the anti-skid control system and particularly the configuration of the safety device. FIG. 9 shows the flow chart of the initial diagnostic. FIG. 10 and 11 show the flow charts of the failsafe processing, with FIG. 10 representing a case where the failsafe function is performed by hardware and software and FIG. 11 representing a case where the same function is carried out by software only.

In the following we will explain about the failsafe processing performed by hardware of FIG. 8, from both hardware and software perspectives.

In FIG. 8, CPU 800 executes software processing shown in FIG. 9 and 10. The CPU 800 may be a digital signal processor.

The CPU 800 has A/D convertor terminals 801, 802, 811, 814, 830, input ports 803, 804, 805, 806, output ports 807, 808, 809, 810, 812, 813. They are not necessarily be incorporated into the CPU 800.

The A/D convertor terminals 801, 802, 811, 814, 830 receive input voltages. Terminals 801, 802 receive voltages output from the acceleration sensors 11a, 11b through wiring harnesses 50a, 50b. The received voltages are converted into accelerations. The terminals 811, 814 receive voltages that have been converted b resistors 821, 822 from currents flowing through the solenoid valves 816, 817. The terminal 830 receives a voltage output from the steering angle sensor 8 through wiring harness 52 and the received voltage is converted into a steering angle.

The input ports 803, 804, 805, 806 receive pulse signals from the wheel speed sensor 3a-3d through wiring harnesses 51a-51d. FIG. 8 does not show a waveform shaping circuit between the sensors and the ports. When the output port 807 goes high, a transistor 818 turns on to operate the relay 815. When the solenoid valve failure is detected, the signal from the output port 807 turns off the relay 815 to prevent erroneous operation of the anti-skid control system.

In this embodiment, the solenoid valves 816, 817 are paired and work to increase, hold or reduce the braking oil pressure. They correspond to the solenoid valve 5a in FIG. 1. Of the paired solenoid valves, the valve 816 has a function of holding the braking oil pressure, while the solenoid valve 817 has a function of reducing the oil pressure. When both valves 816, 817 are off, the braking oil pressure is increased. The solenoid valves 816, 817 are driven by transistors 819, 820 through harnesses 53, 54. These transistors are connected with current detection resistors 821, 822 to detect drive currents.

Operation of the transistors 819, 820 is not performed directly from the ports of the CPU 800 but is done through logic circuit. The logic circuit shown in FIG. 8 is given a hardware failsafe function. That is, the bases of the transistors 819, 820 are connected to OR circuits 823, 824. The OR circuit 823 is supplied input signals from AND circuits 825, 826, and the OR circuit 824 is supplied inputs from AND circuits 827, 828.

One of the inputs of the AND circuit 825 is a hold signal for solenoid valve, which is output from the port 808 when there is a yaw feedback control calculated by the CPU 800, i.e., when the anti-spin control of this embodiment to cancel the yaw moment is performed. The other input of the AND circuit 825 is a signal output from the port 810 to enable or disable the yaw feedback control. As to the other AND circuit 826, one of its inputs is a hold signal for solenoid valve, which is output from the port 809 when there is no yaw feedback control calculated by the CPU 800, i.e., when the anti-spin control of this embodiment is not performed but the normal anti-skid control is performed to keep the target slip rates constant. The other input of the AND circuit 826 is a signal output from the port 810 and inverted by a NOT circuit 829, which enables or disables the yaw feedback control.

When the output of the port 810 is high, the solenoid valve hold signal for performing the yaw feedback control (anti-spin control) is supplied through the OR circuit 823 to the transistor 819. Conversely, when the output of the port 810 is low, the solenoid valve hold signal for not performing yaw feedback control (for performing the normal anti-skid control) is fed through the OR circuit 823 to the transistor 819.

The transistor 820 in FIG. 8 drives the solenoid valve 817 for reducing the braking oil pressure. The OR circuit 820 and AND circuits 827, 828 connected to the transistor 820 correspond to the OR circuit 823 and AND circuits 825, 826 and perform the similar operations.

We have described the operation of the hardware of the safety device. FIG. 8 shows only one solenoid valve drive circuit for one wheel and the real system has three more drive circuits for the remaining wheels.

Next, we will explain about the initial diagnostic performed within the CPU 800 by referring to the flow chart of FIG. 9. The initial diagnostic is performed once at time of power-on reset of the CPU 800, i.e., when the key switch is turned on.

In FIG. 9, a step 901 performs initializing the flag and counter. A step 902 increments the counter i. The value of the counter represents a number corresponding to each solenoid valve. A step 903 turns on a solenoid valve that corresponds to the value of the counter i, for example a solenoid valve 5a. Referring to FIG. 8, this process is achieved by the transistors 819, 820 being driven to energize the solenoid valves 816, 817.

A step 904 checks the conduction of the solenoid valve that was energized at step 903. The conduction check is made by picking up the voltages appearing at the current detection resistors 821, 822 and feeding them to the A/D convertor terminals 811, 814. This permits check for a failure of solenoid valve 5a (816, 817), broken wires of harnesses 53, 54 and failed transistors 819, 820.

A step 905 deenergizes the solenoid valve corresponding to the value of the counter i. The duration of solenoid energization performed in steps 903-905 is short, less than 1 msec, and the solenoid valves are not turned on for all wheels simultaneously, so that there is no possibility of the car at rest moving undesirably.

A step 907 checks for the above-mentioned trouble and, when a solenoid valve failure is detected, sets a failure mode B flag. A step 908 decides if the check has been completed for all solenoid valves. If the check is finished for all solenoid valves, the process proceeds to a step 909. Step 909 to 913 check the yaw sensors. The step 909 checks that the wheel velocities are all zero. The step 910 checks if the voltage of one of the acceleration sensors falls within a certain range. The step 911 checks if the voltage of the other acceleration sensor is within a specified range. With these steps it is possible to check for a failure of acceleration sensors 11a, 11b and broken wire of harnesses 50a, 50b.

The step 912 checks if the voltage difference between the two acceleration sensors falls within the specified range. Since the step 909 has already determined that the car is at rest, any difference between the outputs of the two acceleration sensors means that the car is rotating, which is an impossibility, and is thus judged as being Caused by a sensor failure.

If any of the conditions in the steps 910, 911, 912 is not met, this is judged as a sensor anomaly causing the step 913 to set the failure mode A flag.

In the above embodiment, the failure mode B flag is set when a solenoid valve failure, transistor failure or broken wire of harness is detected. Since failure of wheel speed sensors 3a-3d and broken wire of harnesses 51a-51d also have grave effects on the anti-skid control, as does the solenoid valve failure, these failure may be checked to set the failure mode B flag. Likewise, while in the above embodiment the failure mode A flag is set when failure or abnormal output of the acceleration sensors 11a, 11b or broken wire of the harnesses 50a, 50b is detected, it is possible to check for failed steering angle sensor 8 or broken wire of harness 52 in setting the failure mode A flag because these failures have grave effects on the feedback control of yaw motion (anti-spin control).

Next, the failsafe processing performed when a brake is applied while the car is running will be explained by referring to the flow chart of FIG. 10.

The processing from step 100 to step 110 is executed by a task initiated by regular-interval interrupts (for example every 10 msec).

The step 100 checks whether the failure mode B flag is "1" and, when the flag is found to be set, the step 104 makes the port 807 go low to turn off the relay 815. The step 101 checks if the failure mode A flag is "1" and, when the flag is found to be "1," the step 103 makes the port 810 go low to select by hardware the hold signal for not performing the yaw feedback control and the pressure reducing signal. When the flag is not set, the system is regarded as being normal and the step 103 makes the port 810 go high to select by hardware the hold signal for performing the yaw feedback control and the pressure reducing signal. The steps 105 to 110 perform calculation for the anti-skid control to produce the solenoid control signal for both cases where the yaw feedback control is performed and where it is not.

The step 105 performs a search for the target slip rate tables 43-46 (see FIG. 5). Then for the target slip rate obtained as a result of the search, the next step 106 performs the target slip rate follow-up routine shown in FIG. 7. Then, the step 107 outputs the solenoid valve hold signal and the pressure reducing signal to the ports 803, 813.

The step 108 fixes the target slip rate to 0.2 and the step 109 performs the target slip rate follow-up routine of FIG. 7 for the selected target slip rate. As a result, the step 110 outputs the solenoid valve hold signal and the pressure reducing signal to the ports 809, 812.

In the above, the failsafe processing that employs a combination of hardware and software has been described. Next, we will explain about the case of full-software system.

FIG. 11 shows the flow chart of the failsafe processing of the full-software system.

A step 111 checks if the failure mode B flag is "1." If the flag is "1," a step 118 determines that the failure mode B exists. This is followed by a step 119 deenergizing the relay 815. A step 112 checks to see if the failure mode A flag is "1." When the flag is "1," a step 116 decides that the failure mode A exists and a step 117 fixes the target slip rate to 0.2. When the step 112 has found that the failure mode A flag is not "1," a step 113 determines that the normal operation mode exists, followed by a step 114 searching through the target slip rate table. The program moves from steps 114 and 117 to a step 115 where the target slip rate follow-up routine of FIG. 7 is executed.

With this invention, in the event of a failure of the yaw motion detection means, the first failsafe mode is selected to perform the anti-skid control, which is independent of the output of the yaw motion detection means and which has the target slip rates fixed to a constant value. This assures good braking performance and stability for general anti-skid control. When the control valve is failed, the second failsafe mode is selected to disable the anti-skid control. Although in the second failsafe mode the car easily locks, the car is prevented from experiencing the danger of no-brake condition as will be brought about by the control valve failure, thereby securing a minimum level of safety.

We claim:

1. An anti-skid control system of a vehicle having a plurality of wheels comprising:
   a yaw motion sensing means for sensing yaw motion of the vehicle;
   a calculating means for obtaining target slip rates of the wheels which are varied according to the yaw motion;
   a wheel speed detecting means for detecting actual speeds of the wheels;
   a control means for generating a control signals based on the target slip rates and the actual speeds of the wheels so as to make actual wheel slip rates follow the target slip rates;
   a control valve for controlling braking oil pressure according to the control signals, said braking oil pressure being provided from master cylinder by operation of a brake pedal and fed to a respective wheel cylinder of the wheel thereof;
   a first failure detecting means for detecting an abnormality relating to the yaw motion sensing means;
   a second failure detecting means for detecting an abnormality relating to the control valve; and
   a failsafe control means for keeping the target slip rates from the calculating means constant and when the abnormality relating to the yaw motion sensing means is detected, and for bringing the control valve into a non-operating state when the abnormality relating to the control valve is detected.

2. An anti-skid control system of a vehicle having a plurality of wheels as defined in claim 1, wherein the first failure detecting means detects at least one of a failure and an output anomaly of the yaw motion sensing means and a broken wire of wiring harnesses connected to the yaw motion sensing means.

3. An anti-skid control system of a vehicle having a plurality of wheels as defined in claim 1, wherein the second failure detecting means detects at least one of a failure of the control valve itself, a failure of a control valve drive circuit and a broken wire of wiring harnesses connected thereto.

4. An anti-skid control system of a vehicle having a plurality of wheels as defined in claim 1, wherein a third failure detecting means is provided to detect an abnormality of the wheel speed detecting means, and the failsafe control means brings the control valve into a non-operating state when the abnormality of the wheel speed detecting means is detected.

5. An anti-skid control system of a vehicle having a plurality of wheels as defined in claim 1, the yaw motion sensing means has an angular speed sensor.

6. An anti-skid control system of a vehicle having a plurality of wheels as defined in claim 1, wherein the yaw motion sensing means has two acceleration sensors arranged parallel to each other on one plane of the vehicle body and a means to calculate a difference between outputs of these two acceleration sensors and to determine a yaw angular acceleration from the difference.

7. An anti-skid control system of a vehicle having a plurality of wheels as defined in claim 1, wherein the control means comprises a calculator for calculating target wheel speeds based on the target slip rates and an estimated car speed, and controller for outputting the control signals as differences between said target wheel speeds and the actual speeds of the wheels.

8. An anti-skid control system of a vehicle having a plurality of wheels as defined in claim 1, wherein the control valve increases, decreases or holds the braking oil pressure according to the control signals.

* * * * *